(12) United States Patent
Bronson et al.

(10) Patent No.: US 6,973,528 B2
(45) Date of Patent: Dec. 6, 2005

(54) DATA CACHING ON BRIDGE FOLLOWING DISCONNECT

(75) Inventors: Timothy C. Bronson, Vestal, NY (US); Glenn D. Gilda, Binghamton, NY (US); John M. Sheplock, Raleigh, NC (US); Phillip G. Williams, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 10/153,041

(22) Filed: May 22, 2002

(65) Prior Publication Data

US 2003/0221039 A1    Nov. 27, 2003

(51) Int. Cl.[7] .............................................. G06F 13/00
(52) U.S. Cl. ....................................... 710/310; 710/311
(58) Field of Search ............................... 710/306, 310, 710/313, 314, 315, 311

(56) References Cited

U.S. PATENT DOCUMENTS

| | | | |
|---|---|---|---|
| 5,664,117 A * | 9/1997 | Shah et al. ................... 710/100 |
| 5,881,254 A | 3/1999 | Corrigan et al. |
| 5,915,104 A | 6/1999 | Miller |
| 5,983,306 A | 11/1999 | Corrigan et al. |
| 6,021,480 A | 2/2000 | Pettey |
| 6,044,207 A | 3/2000 | Pecone et al. |
| 6,052,133 A | 4/2000 | Kang |
| 6,170,030 B1 * | 1/2001 | Bell ............................ 710/310 |
| 6,230,219 B1 | 5/2001 | Fields, Jr. et al. |
| 6,330,630 B1 * | 12/2001 | Bell ............................ 710/312 |
| 6,338,119 B1 | 1/2002 | Anderson et al. |
| 6,578,102 B1 * | 6/2003 | Batchelor et al. ........... 710/310 |
| 6,581,129 B1 * | 6/2003 | Buckland et al. ........... 710/306 |
| 6,611,883 B1 * | 8/2003 | Avery .......................... 710/22 |
| 6,636,927 B1 * | 10/2003 | Peters et al. ................. 710/309 |
| 6,820,161 B1 * | 11/2004 | Perez .......................... 710/306 |
| 2003/0028694 A1 * | 2/2003 | Aboulenein et al. ......... 710/107 |

OTHER PUBLICATIONS

Research Disclosure No. 428184, "LRC Check Across PCI Bridge Function", Dec. 1999, p. 1732.
Patent Application, Inventors: Buckland et al. U.S. Appl. No. 09/414,339, filed Oct. 7, 1999, "Intelligent PCI/PCI-X Host Bridge", pp. 1-20.

* cited by examiner

Primary Examiner—Glenn A. Auve
(74) Attorney, Agent, or Firm—William E. Schiesser; Hoffman, Warnick & D'Alessandro LLC

(57) ABSTRACT

To prevent data performance impacts when dealing with target devices that can only transfer data for a limited number of bytes before disconnecting, the invention implements a short term data cache on the bridge. Using this feature, the bridge will cache additional data beyond a predetermined quantity of data following a disconnect with the requesting device. As such, the bridge may continue to prefetch additional data up to an amount specified by a prefetch read byte count and return the additional data should the requesting device request additional data resuming at the point of disconnect. However, the bridge will discard the additional data when at least one of the following occurs: a) the requesting device disconnects data transfer, and b) a further READ request that resumes at the point of disconnect is not received within a predetermined time.

20 Claims, 3 Drawing Sheets

DATA CACHING ON BRIDGE FOLLOWING DISCONNECT

BACKGROUND OF THE INVENTION

1. Technical Field

The present invention relates generally to transparent bridges, and more particularly, to data caching on a bridge following a disconnect with a requesting device.

2. Related Art

Peripheral component interconnect (PCI) and extended PCI (PCIx) transparent bridges are used extensively in conventional computer architecture. For example, PCI/PCIx bridges are used in STORAGE NETWORKING SOLUTIONS by IBM, Corp. and other applications. A problem relative to PCI/PCIx bridges exists, however, where a target on a destination bus can only return a limited number of bytes before disconnecting.

This problem will be explained with reference to FIG. 1. In conventional architecture, a bridge 2 must discard any data, contained within its read buffer 8, prefetched as a result of a READ request 4 from a requesting device 6 when the transaction is complete on a first, originating bus 10. When READ request 4 is received by bridge 2, the bridge responds with a RETRY 12 since the data is not contained within the bridge. Afterwards, bridge 2 issues a READ request 14 on a second, destination bus 16 requesting data from a target device 18. Typically, target device 18 will respond with a RETRY 20 to bridge 2 while it retrieves data. During this time, bridge 2 continues to retry its READ request 14 and receives RETRY 20 from target device 18 until the target device has the requested data. At this point in time, data is transferred to bridge 2 from target device 18 and stored within read buffer 8. The amount of data that is prefetched is based on a prefetch read byte count 22 contained within configuration space (registers) 24 of bridge 2.

While this activity has been occurring, requesting device 6 has been reissuing its READ request 4 to bridge 2. Depending on bridge transfer engine 26 (i.e., control logic), bridge 2 will typically wait until a certain amount of data has been received from destination bus 16 before returning data to requesting device 6. When originating bus 10 is operating in PCI mode, the PCI architecture requires that once bridge 2 starts transmitting data, it must continue transfer until either requesting device 6 completes the transaction or bridge 2 has no more data to return. In the later case, bridge 2 signals a "disconnect" to requesting device 6. At this point in time, the transaction is considered completed, and any additional prefetch data must be discarded from bridge 2.

A problem originates with the above processing where target device 18 on destination bus 16 can only return a limited number of bytes (commonly 128 to 512 bytes) before disconnecting. In this situation, it is possible for bridge 2 to start returning data on originating bus 10 and then be forced to "disconnect" the transaction because it has no more data. As mentioned above, when the originating bus is operating in PCI mode, the "disconnect" by bridge 2 forces the transaction to complete. Requesting device 6 must then generate a new READ request 28 if additional data is required. Consequently, fetching of the data from target device 18 occurs a second time. As a result, performance is adversely impacted when target device 18 can only transfer data in a limited number of bytes before a disconnect occurs.

In view of the foregoing, there is a need in the art for an improved way to operate a bridge such that data transfer can occur despite a disconnection with the requesting device.

SUMMARY OF THE INVENTION

To prevent data performance impacts when dealing with target devices that can only transfer data for a limited number of bytes before disconnecting, the invention implements a short term data caching feature on the bridge. Using this feature, the bridge will save additional data following a disconnect with the requesting device. As such, the bridge may continue to prefetch additional data up to an amount specified by a prefetch read byte count and return the additional data should the requesting device request additional data resuming at the point of disconnect. However, the bridge will discard the additional data when at least one of the following occurs: a) the requesting device disconnects data transfer, and b) a further READ request that resumes at the point of disconnect is not received within a predetermined time.

In a first aspect of the invention, a method for operating a bus bridge connecting first and second buses is provided. The method comprises the steps of: transferring a predetermined quantity of data between the first bus and the second bus in response to a READ request from a requesting device connected to one of the buses; and caching additional data in a buffer on the bridge following a disconnection with the requesting device.

A second aspect of the invention is directed to a method for operating a bus bridge connecting first and second buses, the method comprising the steps of: transferring a predetermined quantity of data between the first bus and the second bus in response to a READ request from a requesting device connected to one of the buses; prefetching additional data following a disconnection with the requesting device; and caching the additional data in a read buffer.

A third aspect of the invention is directed to a transparent bridge comprising: a transfer engine for transferring a predetermined quantity of data between a first bus and a second bus in response to a READ request from a requesting device; and a data cache for caching additional data following a disconnection with the requesting device.

A fourth aspect of the invention is directed to an input-output (I/O) adapter for communicating between a first bus and a second bus, the I/O adapter comprising: a bridge for transferring data between the first bus and the second bus, the bridge including: means for transferring a predetermined quantity of data between the first bus and the second bus in response to a READ request from a requesting device; and means for caching additional data following a disconnection with the requesting device.

A fifth aspect of the invention is directed to a computer program product comprising a computer useable medium having computer readable program code embodied therein for operating a bus bridge connecting first and second buses, the program product comprising: program code configured to transfer a predetermined quantity of data between the first bus and the second bus in response to a READ request from a requesting device connected to one of the buses; and program code configured to cache additional data in a buffer on the bridge following a disconnection with the requesting device.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

Figure 1:
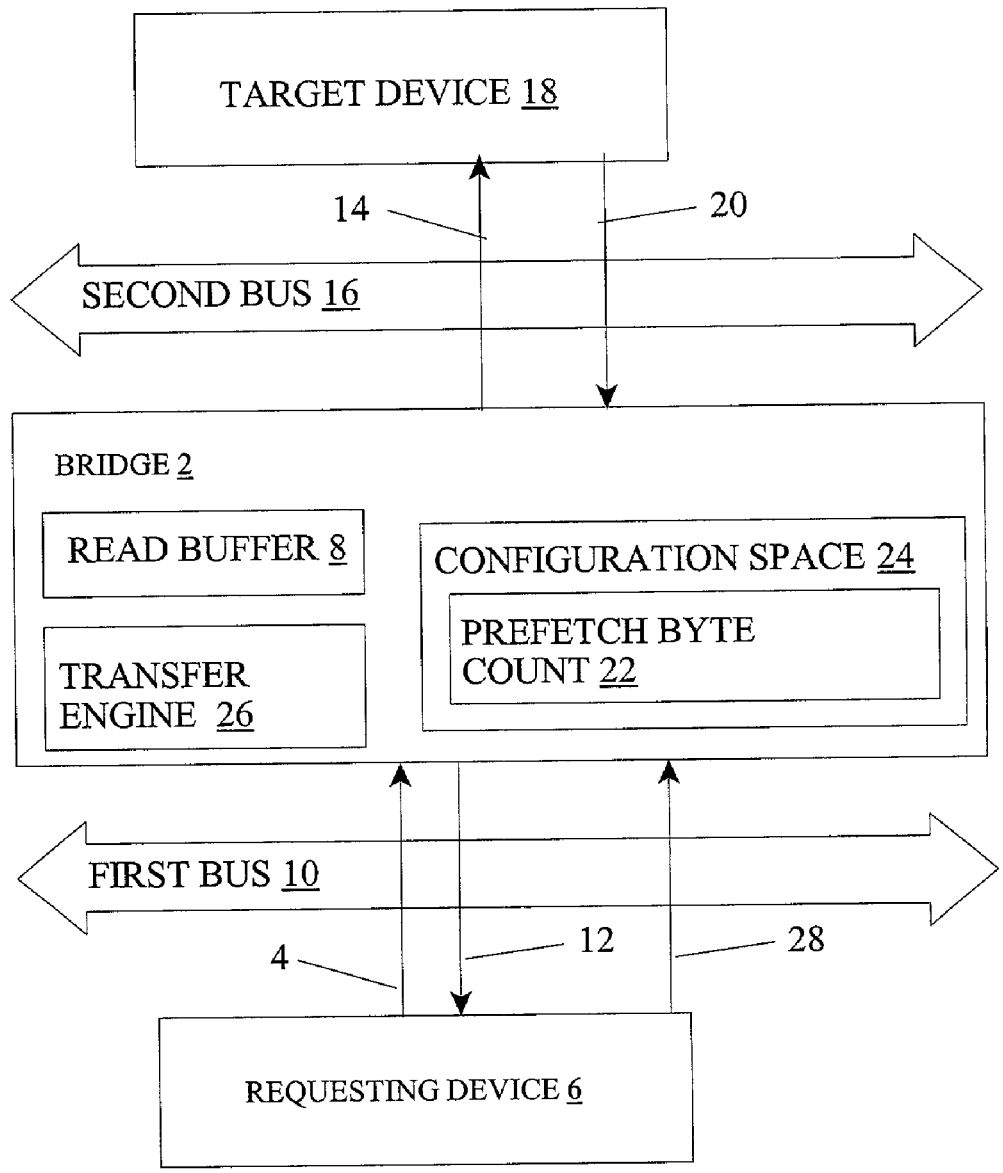
FIG. 1 shows prior art data transfer methodology.
Figure 2:
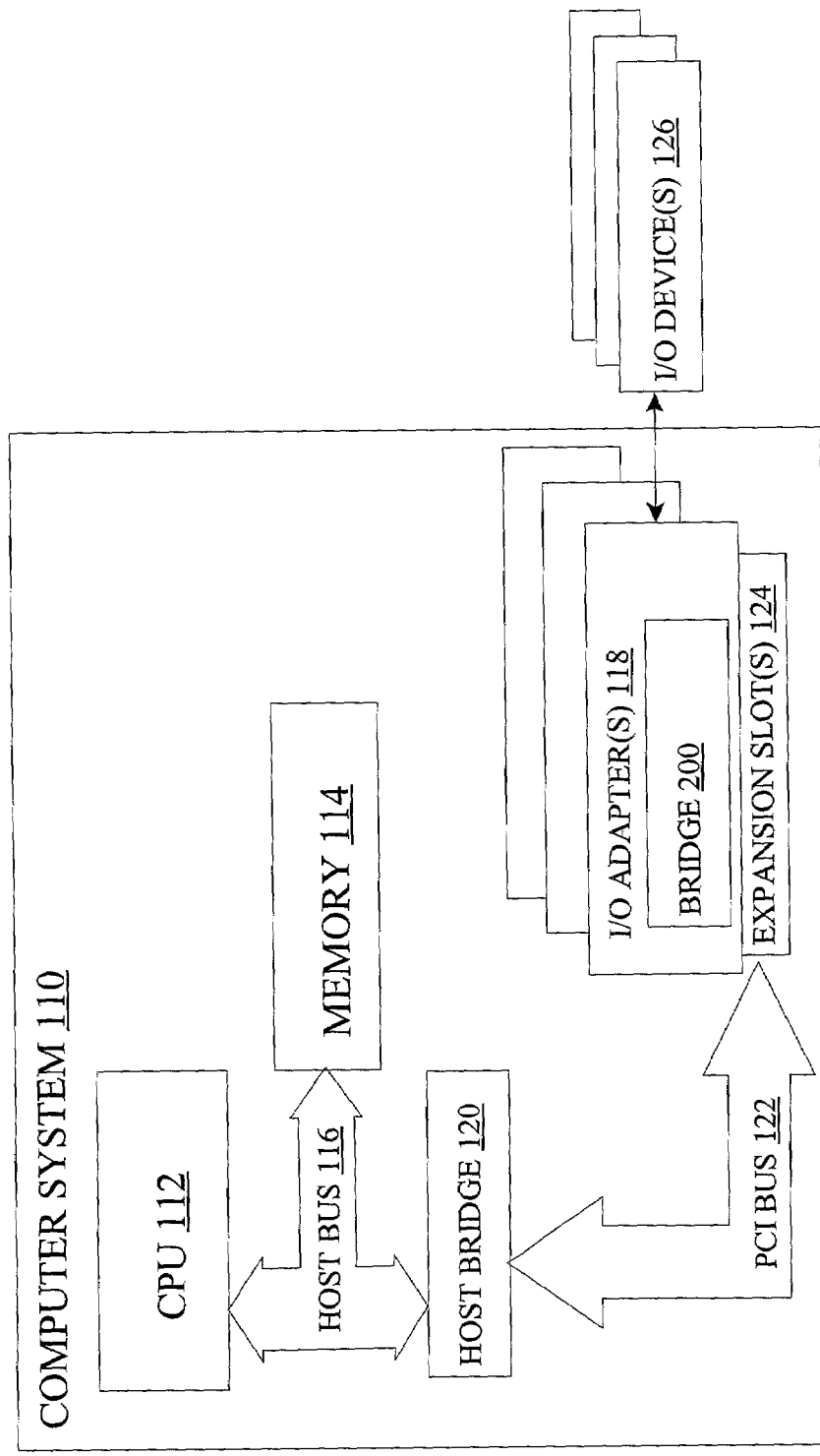
FIG. 2 shows a block diagram of a computer system including an I/O adapter having a bridge incorporating the invention.

For purposes of clarity only, the description includes the following topics:
I. Computer System Overview
II. Bridge Having Data Caching Feature
III. Operation I. Computer System Overview With reference to the accompanying drawings, FIG. 2 is a block diagram of a host computer system 110 in accordance with the invention. Computer system 110 generally includes a central processing unit (CPU) 112, a memory 114, a host bus 116 and at least one input/output (I/O) adapter 118. Additionally, a host bridge 120 may couple to a first PCI bus 122, which in turn couples to any of a number of expansion slots 124. Each expansion slot 124 may contain an I/O adapter 118. Each I/O adapter 118 couples to at least one I/O device 126 and includes a bridge 200, as will be described in more detail below. I/O device 126 may be any now known or later developed device. For purposes of brevity, although the term "PCI bridge" or "PCI bus" will be used, it should be recognized that PCI-to-PCI and/or PCI-to-PCIx architecture is also intended. Memory 114 may include any of a variety of applications that, when executed by CPU 112, comprises various functional capabilities of system 110. Memory 114 may also include any of a variety of well known data storage devices.

CPU 112 may comprise a single processing unit, or a plurality of processing units distributed across one or more locations. A typical server computer may include an advanced mid-range multiprocessor-based system, such as the RS6000 from IBM, utilizing standard operating system software, which is designed to drive the operation of the particular hardware and which is compatible with other system components and I/O adapters. Additional components such as cache memory, communication systems, system software, etc., may also be incorporated into system 110.

II. Bridge Having Data Caching Feature

Figure 3:
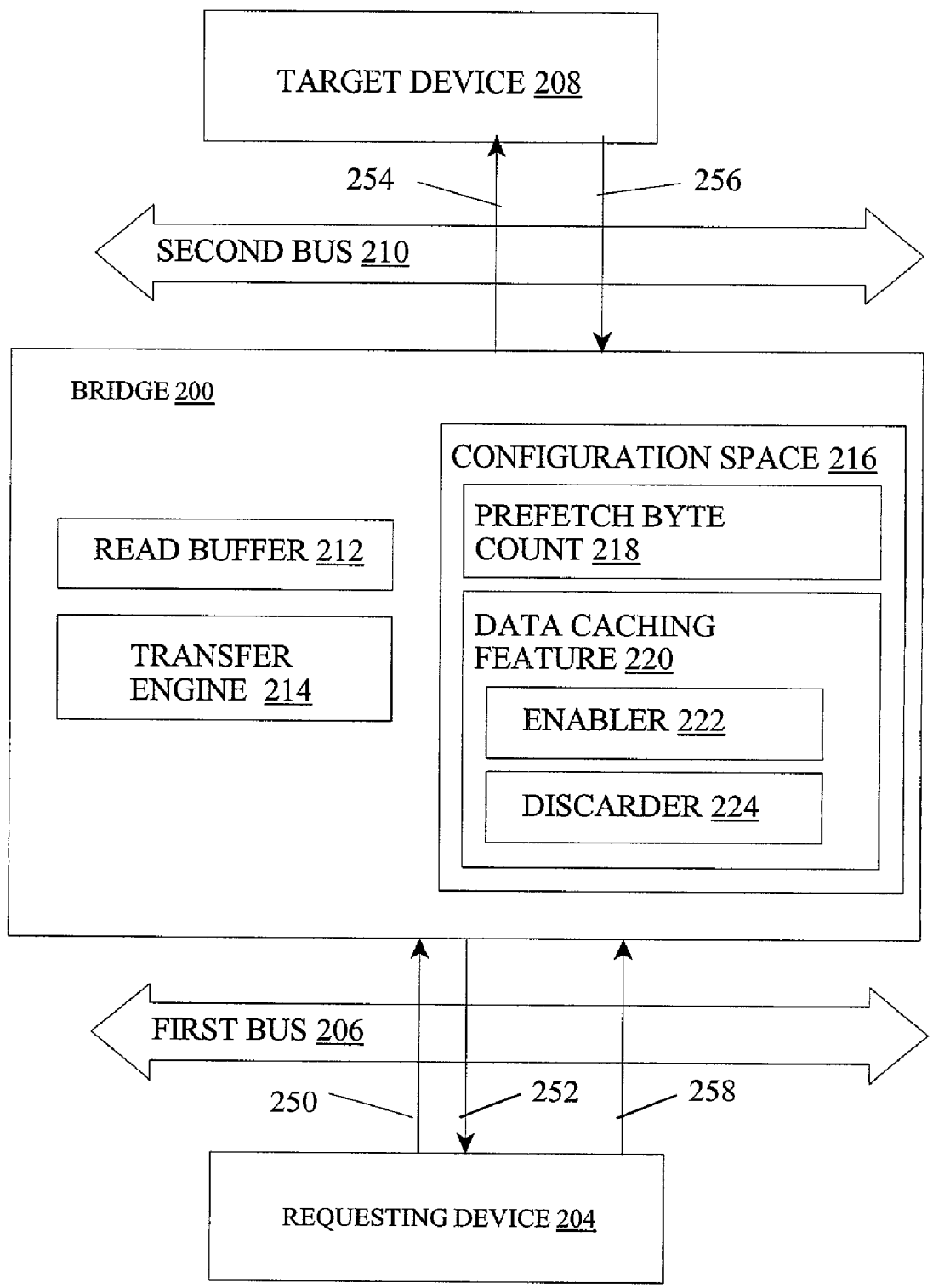
FIG. 3 shows a block diagram of a bridge according to the invention.

Turning to FIG. 3, a bridge 200 in accordance with the invention is shown. At the outset, it will be understood that the block diagram of FIG. 3 is a simplification of an actual bridge with other common bridge components omitted for clarity. Bridge 200 is in communication with a requesting device 204 via a first, originating bus 206 and a target device 208 via a second, destination bus 210. In one embodiment, first bus 206 is of PCI type and second bus 210 may be either PCI type or PCIx type. Bridge 200 includes a read buffer 212, a transfer engine 214 and configuration space 216, e.g., registers. Configuration space 216 includes a prefetch byte count 218 and a data caching feature 220. Prefetch byte count 218 establishes a maximum amount of data that can be transferred by bridge 200. Data caching feature 220 provides functionality that can be characterized as including: an enabler 222 that turns on or off the ability of bridge 200 to cache additional data; and a discarder 224 that discards the additional data when circumstances dictate. Operation of bridge 200 will be described in more detail in the section that follows.

III. Operation

With continuing reference to FIG. 3, operation of bridge 200 will be described in more detail. It should be recognized that while all of the steps of operation of bridge will be described, not all of the steps constitute the inventive nature of the bridge as delineated in the attached claims.

In operation, a READ request 250 from requesting device 204 is transmitted to one of the buses 206, 210 (first bus 206 as shown) and to bridge 200. When READ request 250 is received by bridge 200, the bridge responds with a RETRY 252 since the data is not contained within bridge 200. Afterwards, bridge 200 issues a READ request 254 on second bus 210 requesting data from target device 208. Target device 208 may respond with a RETRY 256 to bridge 200 while it retrieves data, or it may simply submit the requested data. During any latency period, bridge 200 continues to retry its READ request 254 and receives RETRY 256 from target device 208 until the target device has the requested data. While this activity has been occurring, requesting device 204 has been reissuing its READ request 250 to bridge 200.

Once target device 208 has retrieved the data, the data is transferred to bridge 200 by transfer engine 214 from target device 208 and is stored within read buffer 212. Transfer engine 214 (depending on control logic) will typically wait until a predetermined quantity of data has been received from second bus 210 before transferring this data to first bus 206. Target device 208 supplies data at a rate less than requesting device 204 can receive data. In one embodiment, target device 208 transmits data in a predetermined quantity of no less than 128 bytes and no more than 512 bytes. When first bus 206 is operating in PCI mode, the architecture requires that once bridge 200 starts transferring data, it must continue to transfer until either requesting device 204 completes the transaction or bridge 200 has no more data to return. In the latter situation, it is possible for bridge 200 to start returning data on first bus 206 and then run out of data to transfer. In this case, bridge 200 signals a "disconnect" to requesting device 204. Normally at this point in time, the transaction is considered completed and any data stored, or about to be stored, in read buffer 212 is discarded from bridge 200. If any required data has not been received by requesting device 204, a new (further) READ request 258 must be generated, causing the data to be fetched a second time from target device 208. Performance is adversely impacted when this occurs, and especially when this occurs repetitively and/or there are multiple bridges between requesting device 204 and target device 208.

In order to address this problem, data caching feature 220 is provided, which implements a short term data cache on bridge 200 via enabler 222. Using feature 220, transfer engine 214 will prefetch additional data following a disconnection with requesting device 204. In addition, the additional data is cached in read buffer 212. "Cached" means holding data so as to be accessible by requesting device 208. The quantity of additional data can be up to an amount specified by prefetch read byte count 218.

Transfer engine 214 can then transfer the additional data to first bus 206 if requesting device 204 requests additional data, i.e., issues a further READ request 258, without having to fetch it from target device 208. Further READ request 258 usually requests data transfer to resume at the point of disconnect. This provides an increase in performance since the new request does not have to incur the latency of returning to second bus 210 for the data. Instead, the additional data is returned immediately on the initial transaction.

To prevent the accumulation of stale data, discarder 224 is provided to discard the additional data when at least one of the following occurs: a) requesting device 204 disconnects data transfer, i.e., no other data is required; and b) a further READ request that resumes at the point of disconnect is not received within a predetermined time. The predetermined time can be any amount of time considered appropriate to prevent the data from becoming stale. In one embodiment, the predetermined time can be implemented according to certain amount of clock cycles of bridge 200.

Data caching feature 220 and parts thereof can be implemented by a register or set of register(s) of configuration space 216 in a known fashion. Implementation of the above-described data caching feature will apply to all devices attached to first bus 206 to be configured to operate in PCI mode.

The invention has been described relative to a requesting device 204 and target device 208 and their respective buses. It should be recognized that the roles of the devices may interchange in the course of the various transactions conducted through bridge 200. In other words, READ requests, RETRY responses, etc., may be initiated by either device, or both.

In the previous discussion, it will be understood that the method steps discussed may be performed by: hardware contained within bridge 200 and by a set of registers and control hardware within the bridge. However, it is understood that the various devices, modules, mechanisms and systems described herein may be realized in hardware or software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method for operating a bus bridge connecting first and second buses, the method comprising the steps of:
   transferring a predetermined quantity of data between the first bus and the second bus in response to a READ request from a requesting device connected to one of the buses;
   caching additional data, which was prefetched following a disconnection with the requesting device, in a buffer on the bridge; and
   discarding the additional data in the case that a further READ request that resumes at a point of disconnect is not received within a predetermined time.

2. A method for operating a bus bridge connecting first and second buses, the method comprising the steps of:
   transferring a predetermined quantity of data between the first bus and the second bus in response to a READ request from a requesting device connected to one of the buses;
   prefetching additional data following a disconnection with the requesting device;
   caching the additional data in a read buffer; and
   transferring the additional data in the read buffer to the requesting device in response to a further READ request, wherein the further READ request requests data transfer to resume at the point of disconnect.

3. The method of claim 2, wherein the step of prefetching includes prefetching a quantity of the additional data up to a prefetch READ byte count.

4. The method of claim 2, further comprising the step of discarding the additional data in response to at least one of the following:
   a) the requesting device disconnects data transfer; and
   b) a further READ request that resumes at a point of disconnect is not received within a predetermined time.

5. A transparent bridge comprising:
   a transfer engine for transferring a predetermined quantity of data between a first bus and a second bus in response to a READ request from a requesting device;
   a data cache for caching additional data following a disconnection with the requesting device; and
   a discarder for discarding the additional data in the case that a further READ request that resumes at a point of disconnect is not received within a predetermined time.

6. The bridge of claim 5, wherein the transfer engine fetches the additional data up to a prefetch READ byte count.

7. The bridge of claim 5, wherein the transfer engine transfers the additional data cached by the cache to the requesting device in response to a further READ request.

8. The bridge of claim 5, wherein the discarder also discards the additional data in response to the requesting device disconnecting data transfer.

9. The bridge of claim 5, wherein the first bus is of a peripheral component interconnect (PCI) type.

10. The bridge of claim 9, wherein the second bus is one of a peripheral component interconnect (PCI) type and a peripheral component interconnect extended (PCIx) type.

11. The bridge of claim 5, wherein the bridge is part of an I/O adapter.

12. The bridge of claim 5, wherein a target device transmits data at a rate less than the requesting device can receive data.

13. An input-output (I/O) adapter for communicating between a first bus and a second bus, the I/O adapter comprising:
- a bridge for transferring data between the first bus and the second bus, the bridge including:
  - means for transferring a predetermined quantity of data between the first bus and the second bus in response to a READ request from a requesting device and prefetching additional data following a disconnection with the requesting device;
  - means for caching the additional data following the disconnection with the requesting device; and
  - means for discarding the additional data in the case that a further READ request that resumes at a point of disconnect is not received within a predetermined time.

14. The I/O adapter of claim 13, wherein the means for transferring fetches a quantity of the additional data up to a prefetch READ byte count.

15. The I/O adapter of claim 13, wherein the means for transferring transfers the additional data cached by the means for caching to the requesting device in response to a further READ request.

16. The I/O adapter of claim 13, wherein the means for discarding also discards the additional data in response to the requesting device disconnecting data transfer.

17. The I/O adapter of claim 13, wherein the first bus is of a peripheral component interconnect (PCI) type.

18. The I/O adapter of claim 17, wherein the second bus is one of a peripheral component interconnect (PCI) type and a peripheral component interconnect extended (PCIx) type.

19. The I/O adapter of claim 13, wherein a target device transmits data at a rate less than the requesting device can receive data.

20. A computer program product comprising a computer useable medium having computer readable program code embodied therein for operating a bus bridge connecting first and second buses, the program product comprising:
- program code configured to transfer a predetermined quantity of data between the first bus and the second bus in response to a READ request from a requesting device connected to one of the buses, and prefetch additional data following a disconnection with the requesting device;
- program code configured to cache the additional data in a buffer on the bridge following the disconnection with the requesting device; and
- program code configured to discard the additional data in the case that a further READ request that resumes at a point of disconnect is not received within a predetermined time.

* * * * *